(12) United States Patent
Tseytin

(10) Patent No.: US 9,274,929 B2
(45) Date of Patent: *Mar. 1, 2016

(54) CONSTRAINT DERIVATION IN CONTEXT FOLLOWING FOR USE WITH OBJECT CODE INSERTION

(71) Applicant: International Business Machines Corporation, Armonk, NY (US)

(72) Inventor: Gregory S. Tseytin, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/183,916

(22) Filed: Feb. 19, 2014

(65) Prior Publication Data

US 2014/0173572 A1    Jun. 19, 2014

Related U.S. Application Data

(63) Continuation of application No. 11/306,080, filed on Dec. 15, 2005, now Pat. No. 8,732,672.

(51) Int. Cl.
    G06F 9/44       (2006.01)
    G06F 11/36      (2006.01)

(52) U.S. Cl.
    CPC ........ *G06F 11/3612* (2013.01); *G06F 11/3644* (2013.01)

(58) Field of Classification Search
    USPC ........................................................ 717/130
    See application file for complete search history.

(56) References Cited

U.S. PATENT DOCUMENTS

| 5,539,907 | A  |   | 7/1996  | Srivastava et al. |         |
|-----------|----|---|---------|-------------------|---------|
| 5,732,273 | A  |   | 3/1998  | Srivastava et al. |         |
| 5,799,143 | A  |   | 8/1998  | Butt et al.       |         |
| 5,805,863 | A  | * | 9/1998  | Chang             | 717/158 |
| 5,889,999 | A  |   | 3/1999  | Breternitz et al. |         |
| 5,987,249 | A  |   | 11/1999 | Grossman et al.   |         |
| 6,230,312 | B1 | * | 5/2001  | Hunt              | 717/108 |
| 6,308,324 | B1 |   | 10/2001 | Roediger et al.   |         |

(Continued)

FOREIGN PATENT DOCUMENTS

| EP | 0810523 A2    | 12/1997 |
|----|---------------|---------|
| WO | 2007068574 A1 | 6/2007  |

OTHER PUBLICATIONS

Int'l Appln. No. PCT/EP2006/068953, International Search Report, Mar. 19, 2007, 3 pg.
Int'l Appln. No. PCT/EP2006/068953, International Preliminary Report on Patentability, Jun. 18, 2008, 8 pg.

(Continued)

*Primary Examiner* — Hang Pan
(74) *Attorney, Agent, or Firm* — Cuenot, Forsythe & Kim, LLC

(57) ABSTRACT

A method of creating constraints for use with object code insertion technology can include deriving an A-representation and a B-representation of values produced by execution of instructions of a portion of object code, wherein prior to object code insertion the A-representation and the B-representation of a value produced by same instruction(s) are equivalent. The method further can include identifying equalities between A-representations of values produced by different instructions and determining constraints from the identified equalities using B-representations, where the constraints are observed after object code insertion.

20 Claims, 2 Drawing Sheets

(56) References Cited

U.S. PATENT DOCUMENTS

| | | | |
|---|---|---|---|
| 6,470,493 B1* | 10/2002 | Smith et al. | 717/130 |
| 6,658,416 B1 | 12/2003 | Hussain et al. | |
| 6,678,883 B1 | 1/2004 | Berry et al. | |
| 7,512,936 B2 | 3/2009 | Schneider et al. | |
| 2002/0199172 A1 | 12/2002 | Bunnell | |
| 2003/0014742 A1* | 1/2003 | Seth et al. | 717/158 |
| 2004/0019586 A1 | 1/2004 | Harter et al. | |

OTHER PUBLICATIONS

Shah et al., "Information Retrieval on the Semantic Web," ACM, McLean, Virginia, Nov. 4-9, 2002, 8 pg.

Patil et al., "Meteor-S Web Service Annotation Framework," ACM, New York, May 17-22, 2004, 9 pg.

Aho, A.V. et al., "Compilers: Principles, Techniques, and Tools," 2d Ed., Pearson Education, Inc. © 2007. Cover, Table of Contents, pp. 1-4 and 463-465.

* cited by examiner

CONSTRAINT DERIVATION IN CONTEXT FOLLOWING FOR USE WITH OBJECT CODE INSERTION

CROSS-REFERENCE TO RELATED APPLICATIONS

This application is a Continuation of U.S. application Ser. No. 11/306,080, filed on Dec. 15, 2005, the entirety of which is incorporated herein by reference.

FIELD OF THE INVENTION

The present invention relates to the field of computer software and, more particularly, to software development tools for performing runtime analysis on computer programs.

DESCRIPTION OF THE RELATED ART

Object code insertion (OCI) refers to a technology that facilitates runtime analysis of computer programs. As known, a compiler processes a source code representation of a computer program and produces object code as output. Object code refers to machine instructions that are suited to run or be executed on computer hardware, i.e. a particular microprocessor, a mainframe, or the like. OCI refers to the process by which object code for a particular computer program, referred to as a program under test, is augmented with additional object code that performs error checking, monitoring, and/or tracking functions. The inserted object code, which effectively is interwoven into the original object code of the program under test, executes with the program under test to perform runtime analysis.

When object code is created, typically a list of relocations also is created. The list of relocations specifies changes that must be made in the data or in instruction operands of the object code depending upon the actual memory locations into which selected portions of the object code are loaded at runtime. The location in memory of such items, however, cannot be known at the time the object code is created. Each relocation specifies information including, but not limited to, the type of change to be made, the location where the change is to be made, and possibly an extra "addend" to be included in the changed value. With this in mind, object code is largely symbolic in nature and is not resolved into numeric values until actually loaded into memory for execution.

The process of augmenting the object code of a program under test is referred to as instrumenting the program. The object code is analyzed and rewritten to include additional object code insertions which implement the runtime analysis. The insertions cause the original object code of the program under test to be stored in different memory locations than otherwise would have been the case. Since the placement of object code within computer memory can significantly influence the execution of the object code, dependencies in the instrumented object code relating to placement must be adjusted, or patched, so that the pre-instrumentation functionality of the object code is preserved. Accordingly, the instrumented object code is modified post OCI.

"Context following" is the technique used by OCI to obtain the information needed to instrument the object code of the program under test and adjust the instrumented code. A context refers to a collection of one or more statements regarding the contents of selected machine registers and/or storage locations at a certain point of execution of the object code. Context following analysis is performed starting at a particular instruction in the object code, referred to as an entry point. A new context is created from that entry point. The new context begins with a small amount of information such as a statement about the current value of the program counter register. The context is built and expanded statement by statement as more instructions and/or data are processed. More particularly, as further data and instructions are processed, additional statements relating to the contents of the registers, the new value of the program counter, and the like can be added to the current context.

At some point, the behavior of the program under test may depend upon values which cannot be known at the time of OCI. For example, the execution proceeds to one instruction if a particular register contains a zero value and another instruction for values other than zero. To continue context following analysis, the context must be split into two branches. One branch represents the case where the register has a zero value. The other branch represents case where the register has a value other than zero. Assumptions must be added to each respective branch context. Separate processing then can be performed on each individual branch.

Context following analysis can be discontinued for a context at some point when a determination is made that further analysis is unlikely to result in obtaining any additional or meaningful information.

The values of some registers or memory locations obtained in the course of context following allows the OCI program to detect patterns typically used by compilers for tasks such as setting a constant value or an address of a specific data item, or locating an element of an array. Other patterns that can be detected may indicate functions such as executing a "switch" which selects one of several actions depending upon the current value of a particular data item. This sort of information is recorded for future use in performing context following and in performing OCI. The data stored in a context, however, tends to be specialized in that it reflects the instruction patterns found in the object code produced by known compilers.

It would be beneficial to provide a technique for representing contexts in a more generalized fashion than is presently used to help ensure that pre-OCI functionality of a program under test is maintained post instrumentation.

SUMMARY OF THE INVENTION

The embodiments disclosed herein provide methods and articles of manufacture relating to the derivation of constraints for use with object code insertion (OCI) technology. One embodiment of the present invention can include a method of creating constraints for use with OCI technology. The method can include deriving an A-representation and a B-representation of values produced by execution of each instruction of a portion of object code. Prior to OCI, the A-representation and the B-representation of a value produced by same instruction(s) are equivalent. The method further can include identifying equalities between A-representations of values produced by different instructions and determining constraints from the identified equalities using B-representations. The constraints are observed after OCI.

Another embodiment of the present invention can include a method of creating constraints for use with OCI technology. The method can include deriving A-representations and different and equivalent B-representations for values produced through execution of instructions in a portion of object code according to semantics of the object code. The method further can include adding the A-representations and the B-representations to a context for the portion of object code and identifying equalities among the A-representations corresponding to different instructions, addresses, or values. Constraints to be applied after OCI can be generated using the B-representations. The portion of object code can be adjusted after OCI according, at least in part, to the constraints.

Another embodiment of the present invention can include a machine readable storage, having stored thereon, instructions that are executable by a machine for causing the machine to perform the various steps and methods disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein relate to the generation of constraints which can be used for object code insertion (OCI). In accordance with the embodiments disclosed herein, object code of a program under test can be analyzed so that it can be instrumented with additional object code referred to as insertions. The insertions perform runtime analysis upon the program under test. In general, the object code is analyzed using a context following technique in which various portions of the object code are represented using a generalized and largely symbolic notation. Elements of instructions and data can be represented using the notation, thereby creating a plurality of statements concerning a given context of the object code.

More particularly, for each value produced by execution of an instruction, two representations can be generated. The representations are generated based upon the semantics of the instruction. These representations can be compared to identify equivalencies which serve as the basis for creating constraints. The constraints are used in the course of performing OCI on the object code of the program. The object code is adjusted in compliance with the constraints. This ensures that new values for instruction operands, constants in data, as well as relocation addends can be generated. Application of the constraints ensures that pre-OCI functionality of the program is maintained post OCI.

The various examples disclosed herein correspond to object code that has been compiled for use on a SPARC processor architecture as is available from Sun Microsystems of Santa Clara, Calif. The present invention is not intended to be limited, however, to any specific processor architecture. Rather, it should be appreciated that the various techniques disclosed herein can be applied to object code compiled for any of a variety of different processor architectures.

Figure 1:
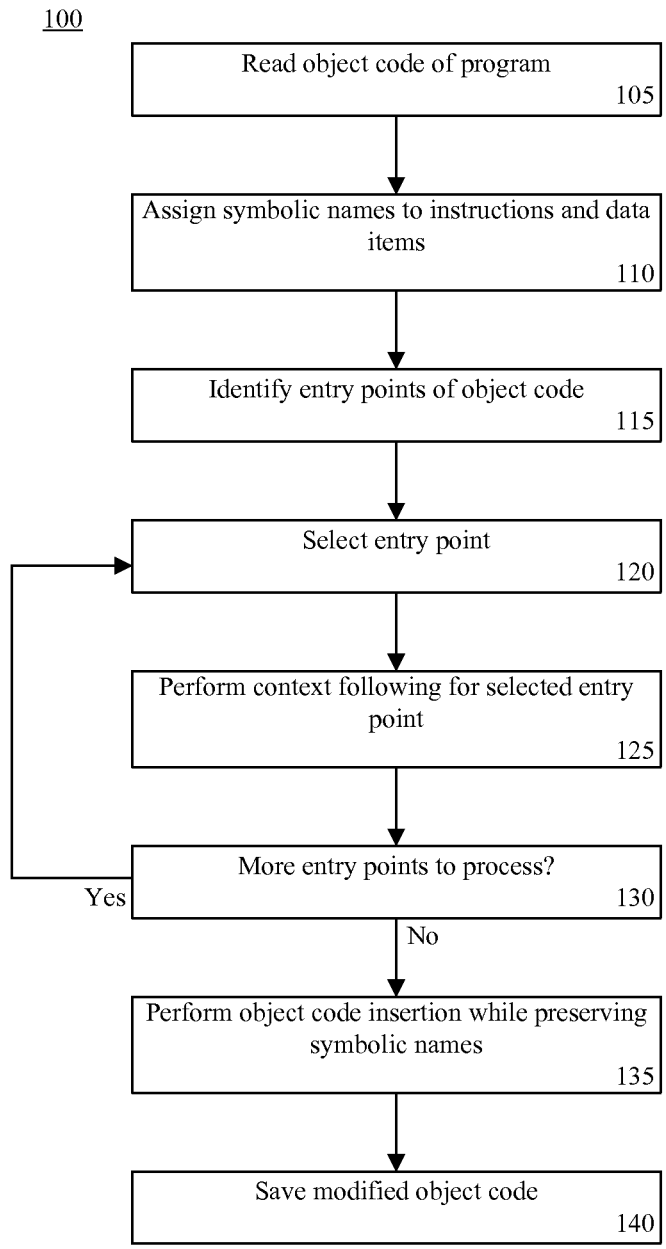
FIG. 1 is a flow chart illustrating a method of instrumenting object code of a program under test which is useful for understanding embodiments of the present invention.

FIG. 1 is a flow chart illustrating a method 100 of instrumenting object code of a program under test which is useful for understanding the embodiments disclosed herein. Method 100 provides a technique for determining constraints for use with OCI technology in accordance with one embodiment of the present invention. Accordingly, method 100 can begin in step 105, where object code of a program under test can be read. In reading the object code, various components such as blocks of executable instructions, blocks of data, relocation information, as well as other control information, can be identified.

In step 110, symbolic names can be assigned to each instruction and data item specified by the instructions. In one embodiment, words can be assigned names based on the address of the word before insertion. For example, if BaseAddr denotes the base address in memory of the portion of object code being processed, the word located at the relative memory address "0x4ace4+BaseAddr" can be assigned a symbolic name of "I__4ace4". It should be appreciated, however, that other naming conventions can be used and that the embodiments described herein are not intended to be limited to any one particular convention for creating and/or assigning names to words, so long as the convention assigns a unique name to each word.

As used herein, a word refers to a portion of object code of a fixed number of bits. The number of bits of a word, whether in reference to one or more instructions or a portion of data in object code, depends upon the particular information processing system, i.e. microprocessor, used to execute the object code. That is, the size of a word corresponds to a unit of information that is processed by a given microprocessor architecture. In one embodiment, for example, a word can be 32 bits, although the present invention is not limited by the particular number of bits used to form a word or the number of words used to form an instruction.

In step 115, entry points of the object code can be identified. It should be appreciated that the number of entry points of the program that have been identified for purposes of context following analysis can change since not all entry points of the program may or may not be identified at this point. As will be discussed in further detail herein, additional entry points may be identified during context following analysis and processed for purposes of context following analysis. In any case, once the entry points have been identified, or an initial set of entry points, an entry point can be selected in step 120 for purposes of context following analysis. In step 125, context following analysis can be performed for the selected entry point and constraints, which will be observed in the course of OCI, can be generated. In step 130, a determination can be made as to whether further entry points remain to be processed. If so, the method can loop back to step 120 to select a next entry point to be processed. If not, the method can proceed to step 135.

In step 135, OCI can be performed. While performing OCI, the symbolic names determined in step 110 can be preserved. During OCI, the OCI tool tracks or maintains the locations of words such that at the completion of OCI, the new location of any displaced word is known. The OCI process itself defines the new location to which each word is moved after OCI. It is necessary, however, after instrumentation of the object code to calculate new values for elements such as instruction operands, constants in the data, as well as relocation addends. Accordingly, such elements can be recalculated using the constraints derived in the course of context following. By ensuring that the constraints are not violated after OCI is performed upon the object code, the functional integrity of the original object code, before OCI, is preserved. In step 140, the instrumented object code can be saved.

Figure 2:
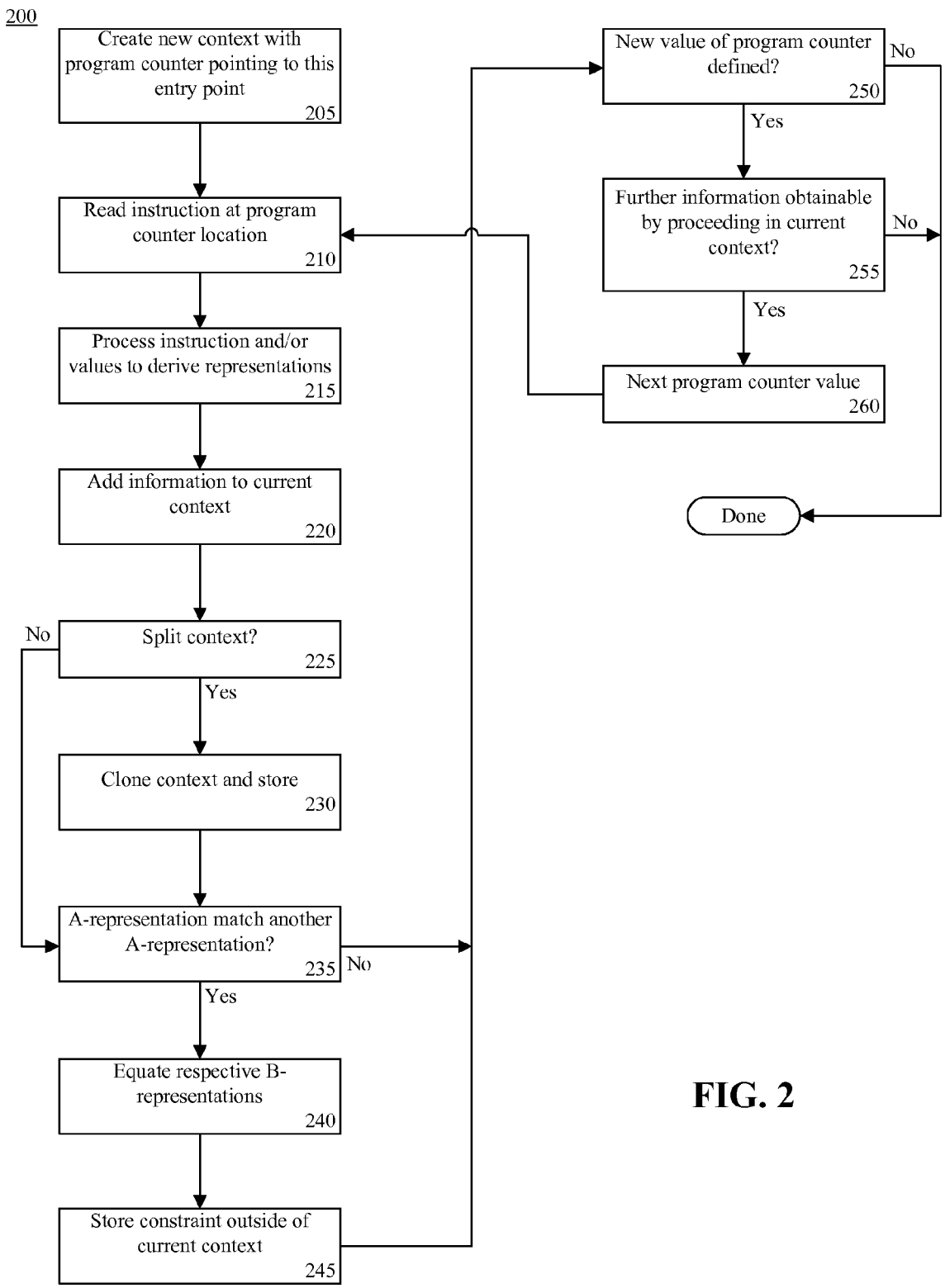
FIG. 2 is a flow chart illustrating a method of performing context following in accordance with the inventive arrangements disclosed herein.

FIG. 2 is a flow chart illustrating a method 200 of performing context following in accordance with the inventive arrangements disclosed herein. Method 200 presents a more detailed explanation of step 125 of FIG. 1. Accordingly, in step 205, context following analysis can be performed starting at an address corresponding to the selected entry point. More particularly, in step 205, a new context can be created which incorporates the value of the program counter for the current entry point.

In step 210, the instruction at the location indicated by the program counter can be read. In step 215, the instruction can be processed and representations for values corresponding to that instruction can be created. The instruction is processed by applying the semantics of the instruction as defined by the processor architecture. In illustration, the instruction can be examined by considering values of machine registers or memory locations that would be produced were the instruction to be executed. When possible, two representations can be derived for values corresponding to the instruction. The two representations, referred to as an A-representation and a B-representation, are different, but equivalent expressions. Symbolic names can be assigned to unknown values.

The A and B-representations for a value can be represented, for purposes of discussion and illustration, using a generalized notation. For example, the address at which a given word N is located can be denoted as "loc(N)". The value stored at the address of N can be denoted as "val(N)". The immediate operand of a given instruction N can be denoted as "op(N)". If the word N is subject to a relocation with an addend, the notation "raddend(N)" can represent the value of the addend.

In terms of developing representations and statements for a given context, the equals sign (=) can indicate equality rather than assignment. The symbol "[x]" can indicate the memory contents at the address x. As such, val(N)=[loc(N)]. The notation {B :: A} can be used to indicate the two representations of a value, where the B-representation is listed prior to the "::", with the A-representation following thereafter. The B-representation can be derived first and the A-representation derived from the B-representation. In cases where the current values are of interest, and not values after OCI, only one representation need be created. In that case, the notation {B :: A} is not needed. A [P] symbol can indicate that a value is a partial value, with only part of the bits containing significant information. The notation [P] may prevent improper generalizations based on such values.

Continuing, for each elementary statement, two representations, A and B, for the value specified by that elementary statement can be defined. The A-representation can be based upon the known constant. The B-representation can be based upon one or more symbolic representations of the value using the above notation elements. For example, the word at address "4ace4" having a symbolic representation of "I_4ace4" can specify the command: sethi % hi (0x16400), % 17. The A-representation can be based upon the known constant "0x16400" which is the operand of the instruction. The B-representation can be based upon the symbolic name that has been assigned to the value. Accordingly, the B-representation can be specified using the notation "op(I_4ace4)", which indicates the operand of the word symbolically represented by "I_4ace4".

The A-representation can be resolved to the extent possible resulting in as much numeric evaluation as is possible. The B-representation, however, can remain as close to the source from which it was obtained and remain largely symbolic. Prior to performing OCI on the program under test, the A and B-representations for a value symbolically represented as I_4ace4 are equivalent. The relationship between representations A and B can be expressed as {B::A}, which translates to {op(I_4ace4) :: 0x16400}.

As used herein, an elementary instruction can refer to an instruction that includes a description of a location as well as a value that is stored at that location. An elementary instruction can specify various other attributes including, but not limited to, an operation to be performed on a value to produce a new value. Generally, an instruction is a small element of the executable code and is defined according to the processor architecture. In this sense, a location can be restricted to a machine register or a stack location as may be defined in terms of a displacement from the current value of the stack pointer or frame pointer depending upon the computer architecture used. The present invention is not intended to be limited to analysis with respect to any one type of memory location as other memory locations can be incorporated and evaluated in terms of context following.

Within the OCI tool, a value can include, but is not limited to, an integer constant, a value used in relocations such as a symbol value, a specially introduced variable representing an initial value at the start of a code fragment being analyzed, a part of a value selected by a constant mask, a linear combination of the aforementioned items with integer coefficients, or a bit in a condition-code register. It should be appreciated that the listing of what constitutes a value for purposes of context following can be extended to expand the variety of allowed representations or restricted to reduce the variety of allowed representations created as may be desired.

In step 220, the information obtained in step 215 can be added to the current context. In step 225, a determination can be made as to whether the current context should be split. More particularly, in cases where a value may take on any of a plurality of different values that are not knowable during context following, a clone of the current context can be created for each possible value. After creating the clone(s), alternative assumptions regarding the cloned context(s) can be added to each clone.

In one embodiment, processing of the current context can be continued while the cloned context(s) are saved for further processing at a later time. For example, a listing of contexts that require processing can be maintained. Accordingly, the various steps disclosed herein relating to context following can be performed for any context that may require such processing. This would include any cloned contexts.

In another embodiment, a parallel thread can be started to follow the cloned context(s). Accordingly, separate context processing can be implemented for each cloned context. The creation of a cloned context as discussed herein is analogous to a branch of the computer program which may only be determined at runtime. In any case, if a context is to be split, the method can proceed to step 230 where the current context is cloned with a cloned context being created for each possible value of the unknowable value. If the current context is not split, the method can proceed to step 235.

In step 235, a determination can be made as to whether the newly created A-representation associated with the current instruction matches, or is equivalent to, another A-representation, e.g., one for an address or contents of another word, or one obtained from a previously analyzed instruction. If so, the method can proceed to step 240. If not, the method can continue to step 250. For two equivalent A-representations, the respective B-representations are equivalent. Accordingly, an equivalency relationship between the two B-representations can be specified as a constraint in step 140. Such is the case when the A-representation equivalency detected in step 235 is not considered to be an accidental coincidence according to an established policy. In one embodiment, a policy can be adopted which excludes pure constants and partial values. The particular policy adopted to prevent accidental coincidences, however, can vary according to design preference and the particular application for which OCI is being performed. As such, it is not intended to limit the present invention. In any case, in step 245, the equivalency between the two B-representations can be added as a constraint to be observed when OCI is performed. The constraint can be remembered outside of the current context.

Continuing with step 250, a determination can be made as to whether a next value of the program counter is defined. The next value of the program counter will indicate the next instruction to be processed for context following. If the next value of the program counter can be determined, the method can proceed to step 255. If not, the method can end or return. In step 255, a determination can be made as to whether additional information can be ascertained should further analysis be performed upon the current context. If so, the method can proceed to step 260 where the next program counter value is loaded and the method loops back to step 210 to continue processing. If not, the method can end or return as the case may be.

In further illustration, consider the case where a next word in the current context is an instruction at address 4ace8. The instruction can be call .–0x278. The symbolic name assigned to the word can be "I__4ace8". The B and A-representations {B::A} can be denoted as: {loc(I__4ace8) :: o×4ace8+ BaseAddr}. Other information can be derived such as op(I__ 4ace8)=–0x278, % pc=o×4acec+BaseAddr, and % npc={loc (I_ace8)+op(I__4ace8) :: 0x4aa70+BaseAddr}, where % pc is the program counter and % npc indicates the next value of the program counter.

The embodiments disclosed herein have been provided for purposes of illustration only, and as such, are not intended as limitations of the present invention. For example, with respect to representing operands of an instruction, it may be the case that a given processor architecture supports multiple immediate operands. In that case, the notation discussed herein can be modified support such instructions, for instance, through the inclusion of notation such as "op1(N)", "op2(M)", or the like. In any case, it should be appreciated that the embodiments disclosed herein can be applied to any of a variety of different processor architectures. Accordingly, particular implementation details will vary with the architecture to which the embodiments are applied. Such differences, however, are within the scope of the present invention.

As analysis for a context proceeds to another instruction, the relationships derived based upon prior statements are available for use in representing values corresponding to the current statement or word. In this manner, the contexts are built. Each instruction is analyzed and can produce new values that overwrite previous values at the same register or storage location, for example. Accordingly, previous statements about those values then can be deleted from the context.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of creating constraints for use with object code insertion technology, said method comprising:
    deriving, by a processor, an A-representation and a B-representation for values produced by execution of instructions of a portion of original object code, wherein prior to object code insertion the A-representation and the B-representation of a value produced by a same instruction are equivalent;
    identifying, by the processor, equalities between A-representations of values produced by different instructions; and
    determining, by the processor, constraints from the identified equalities using B-representations;
    inserting, by the processor, additional object code into the original object code to generate revised object code; and
    adjusting, by the processor, the revised object code in compliance with the constraints;
    wherein the constraints are observed in the revised object code after the additional object code is inserted into the original object code.

2. The method of claim 1, further comprising computing at least one of an instruction operand, a constant in data, or a relocation addend after object code insertion according, at least in part, to the constraints.

3. The method of claim 1, further comprising assigning a symbolic name to each word in the object code.

4. The method of claim 1, for a given word in the portion of object code, said deriving step further comprising:
- first, deriving the B-representation, wherein the B-representation is symbolic; and
- at least partially resolving the B-representation to determine the A-representation.

5. The method of claim 4, said step of partially resolving the B-representation further comprising resolving the A-representation to a value.

6. The method of claim 1, wherein at least one of the A or B-representations comprises an indication of an address of an instruction.

7. The method of claim 1, wherein at least one of the A or B-representations comprises an indication of an operand of an instruction.

8. The method of claim 1, wherein at least one of the A or B-representations comprises an indication of a value stored in an address corresponding to a selected instruction.

9. The method of claim 1, wherein at least one of the A or B-representations comprises an indication of a value of an addend to be used in a relocation operation.

10. The method of claim 1, wherein the A-representation and the B-representation for each instruction are determined according to semantics of the instruction.

11. A method of creating constraints for use with object code insertion technology, said method comprising:
- deriving, by a processor, A-representations and different and equivalent B-representations for values produced through execution of instructions in a portion of object code according to semantics of the object code;
- adding, by the processor, the A-representations and the B-representations to a context for the portion of object code;
- identifying, by the processor, equalities among the A-representations corresponding to different instructions, addresses, or values;
- generating, by the processor, constraints using the B-representations to be applied during object code insertion; and
- adjusting, by the processor, the portion of object code after object code insertion according, at least in part, to the constraints.

12. The method of claim 11, wherein said representations comprise an indication of an address of an instruction, an indication of an operand of an instruction, an indication of a value stored in an address corresponding to a selected instruction, or an indication of a value of an addend to be used in a relocation operation.

13. A machine readable storage device, wherein the machine readable storage device is not a transitory, propagating signal per se, having stored thereon computer program code comprising:
- code for deriving, by a processor, A-representations and different and equivalent B-representations for values produced through execution of instructions in a portion of object code according to semantics of the object code;
- code for adding, by the processor, the A-representations and the B-representations to a context for the portion of object code;
- code for identifying, by the processor, equalities among the A-representations of values produced by different instructions;
- code for generating, by the processor, constraints using the B-representations to be applied after object code insertion; and
- code for adjusting, by the processor, the portion of object code after object code insertion according, at least in part, to the constraints.

14. The machine readable storage device of claim 13, further comprising code for computing at least one of an instruction operand, a constant in data, or a relocation addend after object code insertion according, at least in part, to the constraints.

15. The machine readable storage device of claim 13, for a given word of the portion of object code, said code for deriving further comprising:
- code for first, deriving the B-representation, wherein the B-representation is symbolic; and
- code for at least partially resolving the B-representation to determine the A-representation.

16. The machine readable storage device of claim 15, said code for partially resolving the B-representation further comprising code for resolving the A-representation to a value.

17. The machine readable storage device of claim 13, wherein at least one of the A or B-representations comprises an indication of an address of an instruction.

18. The machine readable storage device of claim 13, wherein at least one of the A or B-representations comprises an indication of an operand of an instruction.

19. The machine readable storage device of claim 13, wherein at least one of the A or B-representations comprises an indication of a value stored in an address corresponding to a selected instruction.

20. The machine readable storage device of claim 13, wherein at least one of the A or B-representations comprises an indication of a value of an addend to be used in a relocation operation.

* * * * *